United States Patent
Shavell et al.

(10) Patent No.: US 10,009,425 B1
(45) Date of Patent: Jun. 26, 2018

(54) SYNCHRONIZATION OF TRANSACTIONS UTILIZING MULTIPLE DISTRIBUTED CLOUD-BASED SERVICES

(71) Applicant: Symantec Corporation, Mountain View, CA (US)

(72) Inventors: Michael Shavell, Merrimack, NH (US); Jason Holler, Reston, VA (US)

(73) Assignee: Symantec Corporation, Mountain View, CA (US)

( * ) Notice: Subject to any disclaimer, the term of this patent is extended or adjusted under 35 U.S.C. 154(b) by 196 days.

(21) Appl. No.: 15/230,312

(22) Filed: Aug. 5, 2016

(51) Int. Cl.
*H04L 29/08* (2006.01)
*H04L 29/06* (2006.01)

(52) U.S. Cl.
CPC ...... *H04L 67/1095* (2013.01); *H04L 67/1097* (2013.01); *H04L 67/42* (2013.01)

(58) Field of Classification Search
CPC .. H04L 67/1095; H04L 67/42; H04L 67/1097
See application file for complete search history.

(56) References Cited

U.S. PATENT DOCUMENTS

| | | | | |
|---|---|---|---|---|
| 9,781,232 B2* | 10/2017 | Tsuchiya | ............... | H04L 67/42 |
| 9,942,050 B2* | 4/2018 | Shi | ................... | H04L 9/3263 |
| 2011/0119345 A1* | 5/2011 | Chopra | ................ | G06Q 30/02 |
| | | | | 709/217 |
| 2011/0153727 A1* | 6/2011 | Li | .................... | G06F 9/5055 |
| | | | | 709/203 |
| 2013/0080509 A1* | 3/2013 | Wang | .................. | H04L 12/66 |
| | | | | 709/203 |
| 2017/0193233 A1* | 7/2017 | Lorini | ................. | G06F 21/602 |
| 2017/0237572 A1* | 8/2017 | Shi | ................... | H04L 9/3263 |
| | | | | 713/156 |
| 2018/0027075 A1* | 1/2018 | Schoeffler | ........ | H04L 67/1095 |

* cited by examiner

*Primary Examiner* — Jerry B Dennison
(74) *Attorney, Agent, or Firm* — Patent Law Works LLP (57) ABSTRACT

A SPOC server receives a request to initiate a transaction utilizing multiple separate distributed cloud based services located on separate datacenters, from an endpoint. The SPOC server generates a transaction identifier for the transaction. The SPOC server transmits the generated transaction identifier to the endpoint. Receipt of the generated transaction identifier directs the endpoint to call each one of the separate services, with the transaction identifier. Over time, the SPOC server receives a separate service completion notification with the generated transaction identifier from each one of the separate services. Each separate service completion notification indicates that the corresponding service has completed. Only in response to receiving a separate service completion notification from each one of the separate distributed cloud based services, the SPOC server transmits a transaction completion notification with the generated transaction identifier to the endpoint. The transaction completion notification indicates that the transaction is complete.

20 Claims, 4 Drawing Sheets

SYNCHRONIZATION OF TRANSACTIONS UTILIZING MULTIPLE DISTRIBUTED CLOUD-BASED SERVICES

TECHNICAL FIELD

This disclosure pertains generally to distributed systems, and more specifically to synchronization of transactions across multiple, separate distributed cloud based services located on separate datacenters.

BACKGROUND

Contemporary cloud based datacenters can make applications, services and data available to large numbers of endpoint client computers, as well as to other services. In some cases, it can be desirable for an endpoint to initiate a single transaction that occurs across multiple services. For example, if a given endpoint registers with a backend system, the transaction could involve separate registration, authentication and notification services on the backend. Where the multiple services are distributed across cloud based servers in multiple separate datacenters, attempting to provide the single transaction across the separate services has the potential to trigger timing issues on the endpoint. For example, notifications that events have been completed by individual services could reach the endpoint before the separate backend systems providing the different services have each completed their operations and arrived at internal consistency concerning the transaction.

It would be desirable to address these issues.

SUMMARY

A single point of contact (SPOC) server enables synchronized transactions across multiple, separate distributed cloud based services located on separate datacenters. The SPOC server can be in the form of a distributed, cloud based service. The SPOC server receives a request to initiate a transaction utilizing multiple separate distributed cloud based services located on separate datacenters, from an endpoint (e.g., a client computer or another service). In response, the SPOC server generates a transaction identifier for the transaction utilizing multiple separate distributed cloud based services. In one embodiment, the transaction identifier indicates how many separate distributed cloud based services are to be utilized by the transaction. The SPOC server transmits the generated transaction identifier to the endpoint. Receipt of the generated transaction identifier from the SPOC server directs the endpoint to call each one of the separate distributed cloud based services, with the generated transaction identifier for the transaction.

Over time, the SPOC server receives a separate service completion notification with the generated transaction identifier from each one of the separate distributed cloud based services. Each separate service completion notification indicates that the corresponding separate service has completed. In one embodiment, these separate service completion notifications are in the form of separate events with the generated transaction identifier from the separate distributed cloud based services, each event signaling completion of a corresponding service. Only in response to receiving a separate service completion notification with the generated transaction identifier from each one of the separate distributed cloud based services, the SPOC server transmits a transaction completion notification with the generated transaction identifier to the endpoint. The transaction completion notification indicates that the transaction utilizing the multiple separate distributed cloud based services is complete. Put another way, the SPOC server locks the transaction utilizing multiple separate distributed cloud based services upon generation of the transaction identifier, and unlocks the transaction upon completion of each separate distributed cloud based service utilized thereby.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
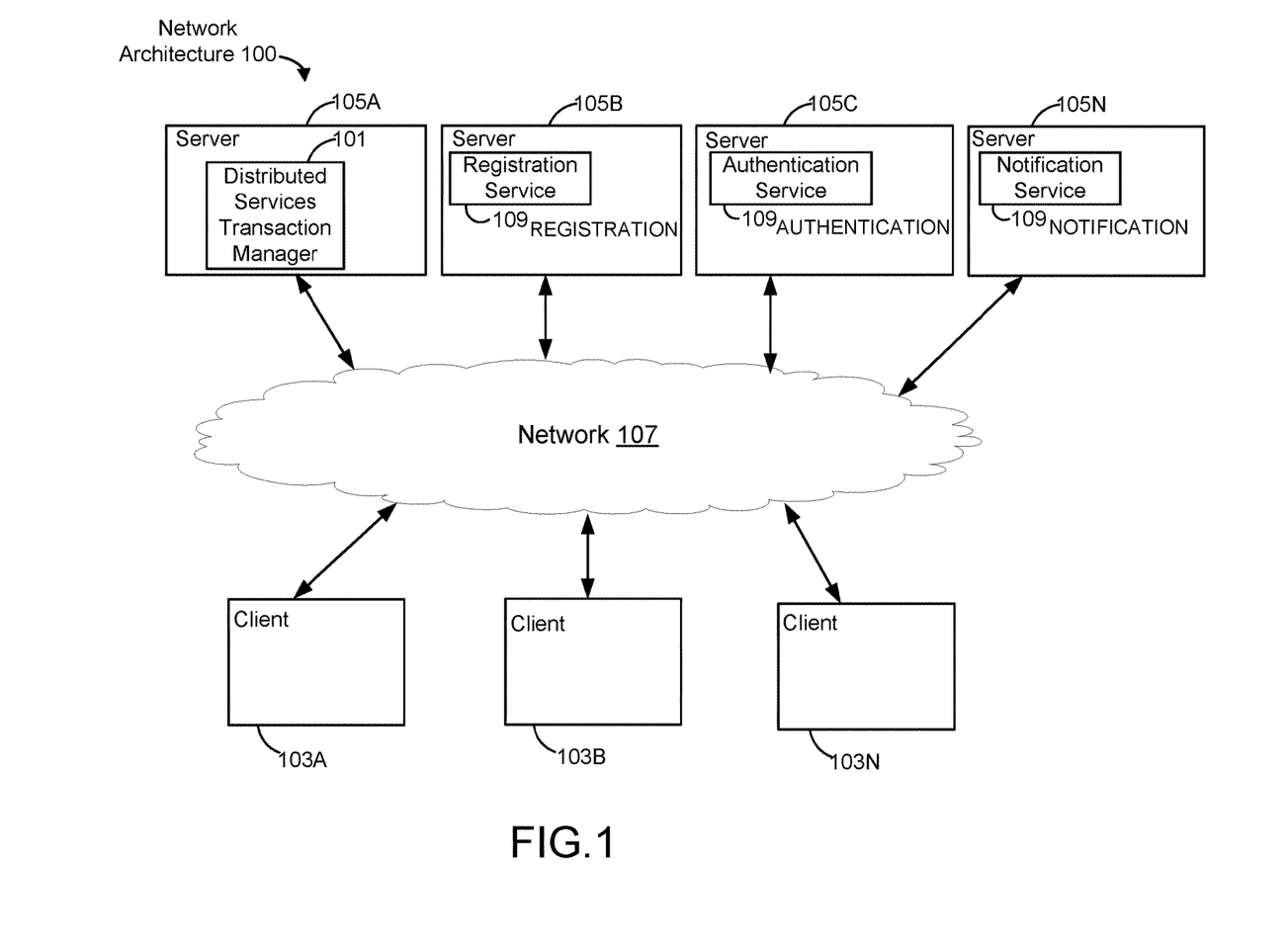
FIG. 1 is a block diagram of an exemplary network architecture in which a distributed services transaction manager can be implemented, according to some embodiments.

FIG. 1 is a block diagram illustrating an exemplary network architecture 100 in which a distributed services transaction manager 101 can be implemented. The illustrated network architecture 100 comprises multiple clients 103A, 103B and 103N, as well as multiple servers 105A, 105B, 105C and 105N. In FIG. 1, the distributed services transaction manager 101 is illustrated as residing on server 105A. It is to be understood that this is an example only, and in various embodiments various functionalities of this system 101 can be instantiated on a client 103, a server 105, or can be distributed between multiple servers 105, clients 103 and/or other computing devices 210.

Clients 103 and servers 105 can be implemented using computer systems 210 such as the one illustrated in FIG. 2 and described below. The clients 103 and servers 105 are communicatively coupled to a network 107, for example via a network interface 248 as described below in conjunction with FIG. 2. Clients 103 are able to access applications and/or data on servers 105 using, for example, a web browser or other client software (not shown). Clients 103 can but need not be in the form of mobile computing devices, comprising portable computer systems 210 capable of connecting to a network 107 and running applications, such as smartphones. Tablets, wearable computing devices, netbooks, hybrids and laptop computers are other examples of mobile computing devices.

Although FIG. 1 illustrates three clients 103 and four servers 105 as an example, in practice many more (or fewer) clients 103 and/or servers 105 can be deployed. In FIG. 1, servers 105B, 105C and 105N are depicted as providing a registration service $109_{REGISTRATION}$, an authentication service $109_{AUTHENTICATION}$ and a notification service $109_{NOTIFICATION}$ respectively. These are just examples of possible services 109, as described in more detail below. It is further to be understood that whereas FIG. 1 illustrates each of these three example services 109 residing on a single server 105, in practice such cloud based services 109 can be distributed across multiple computers 210 in a datacenter, for example in the form of a high availability cluster.

In one embodiment, the network 107 is in the form of the Internet. Other networks 107 or network-based environments can be used in other embodiments.

Figure 2:
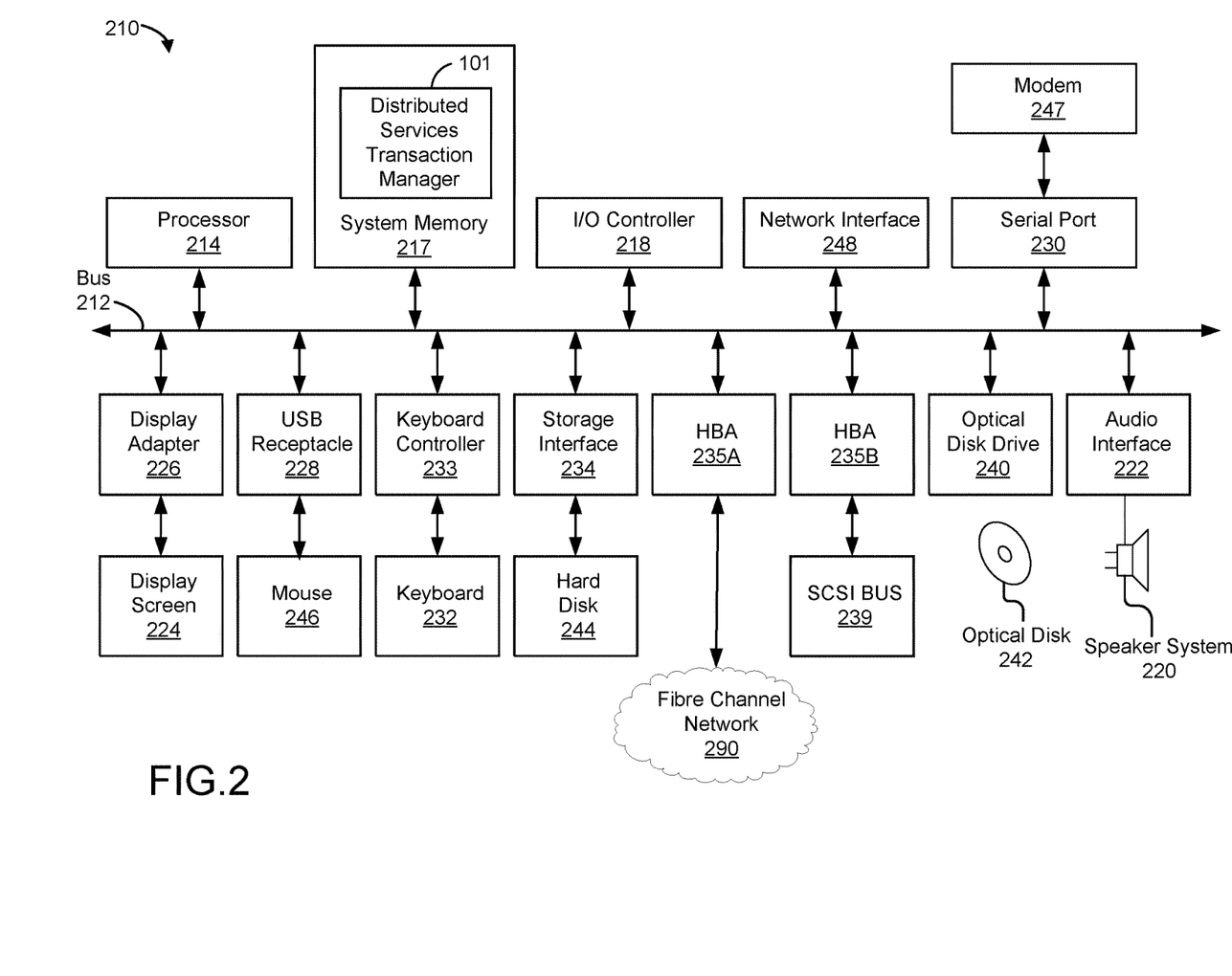
FIG. 2 is a block diagram of a computer system suitable for implementing a distributed services transaction manager, according to some embodiments.

FIG. 2 is a block diagram of a computer system 210 suitable for implementing a distributed services transaction manager 101. Clients 103 and servers 105 can all be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory, an input/output (I/O) controller 218, an audio output interface 222 communicatively coupled to an audio output device such as a speaker 220, a display adapter 226 communicatively coupled to a video output device such as a display screen 224, one or more interfaces such as Universal Serial Bus (USB) ports 228, serial ports 230, parallel ports (not illustrated), etc., a keyboard controller 233 communicatively coupled to a keyboard 232, a storage interface 234 communicatively coupled to one or more hard disk(s) 244 (or other form(s) of storage media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212, e.g., via a USB port 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 242 or external pointing devices 246, although various external components can be coupled to mobile computing devices via, e.g., USB ports 228). In different embodiments the various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242, flash memory) and loaded into system memory 217 and executed by the processor 214. Application programs can also be loaded into system memory 217 from a remote location (i.e., a remotely located computer system 210), for example via the network interface 248. In FIG. 2, the distributed services transaction manager 101 is illustrated as residing in system memory 217. The workings of the distributed services transaction manager 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and/or modem 247 can be directly or indirectly communicatively coupled to a network 107 such as the internet. Such coupling can be wired or wireless.

Figure 3:
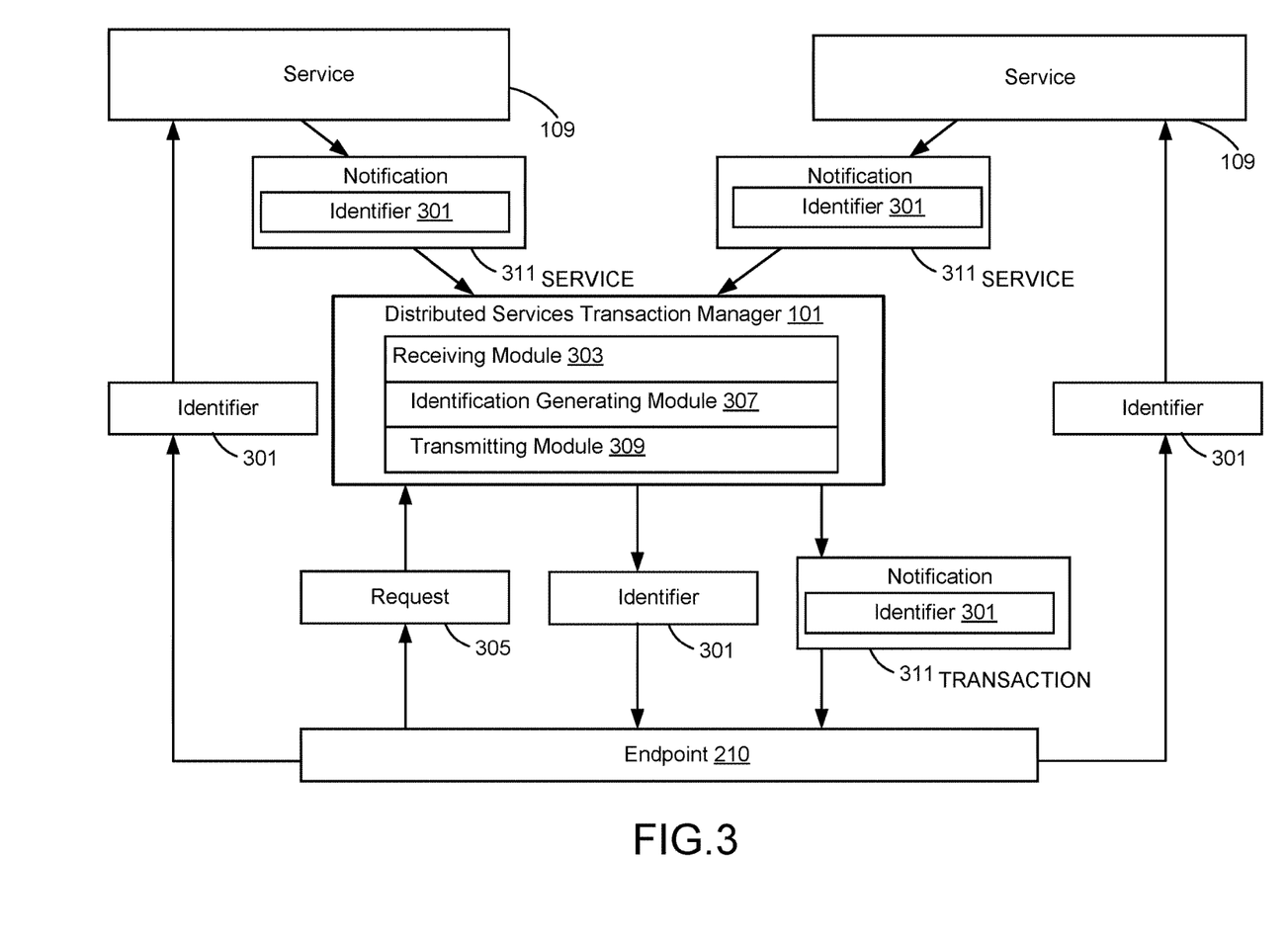
FIG. 3 is a high level block diagram of the operation of a distributed services transaction manager, according to some embodiments.

FIG. 3 illustrates the operation of a distributed services transaction manager 101 running on a server 105. As described above, the functionalities of the distributed services transaction manager 101 can reside on specific computers 210 or be otherwise distributed between multiple computer systems 210, including within a fabric/cloud-based computing environment in which the functionality of the distributed services transaction manager 101 is provided as a cloud based service over a network 107. It is to be understood that although the distributed services transaction manager 101 is illustrated in FIG. 3 as a single entity, the illustrated distributed services transaction manager 101 represents a collection of functionalities, which can be instantiated as a single or multiple modules as desired (instantiation of a specific, multiple module distributed services transaction manager 101 is illustrated in FIG. 3). It is to be understood that the modules of the distributed services transaction manager 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client computer," "server computer" and "computing device" mean one or more computers configured and/or programmed to execute the described functionality. Additionally, program code to implement the functionalities of the distributed services transaction manager 101 can be stored on computer-readable storage media. Any form of tangible computer readable storage medium can be used in this context, such as magnetic, optical or solid state storage media. As used herein, the term "computer readable storage medium" does not mean an electrical signal separate from an underlying physical medium.

FIG. 3 illustrates the distributed services transaction manager 101 interacting with a single endpoint computer 210, and two services 109. It is to be understood that in practice the distributed services transaction manager 101 can interact with more endpoints 210 and/or services 109, including orders of magnitude more in some scenarios. Each service 109 is illustrated as a single entity, but in fact would typically be in the form of a cloud based datacenter comprising multiple servers 105 and other computing devices 210, configured for providing an online service 109 to multiple parties. The parties that use such services 109 can be in the form of, for example, client computers 103 and/or other services 109.

By operating as a single point of contact (SPOC), the distributed services transaction manager 101 provides consistency across a single transaction that utilizes multiple, separate distributed cloud based services 109. As a SPOC, the distributed services transaction manager 101 acts as an intermediary between the multiple services 109 and the endpoint 210 during the transaction. Communication between the components (services 109 and endpoint 210) during the transaction are conducted through the SPOC distributed services transaction manager 101, or in direct response to a directive therefrom. The distributed services transaction manager 101 centralizes a single transaction identifier 301 across all components involved in the multi-service transaction, locks the transaction, and holds the notification on transaction state from being transmitted to the endpoint 210 until each service 109 has completed, and the backend is synchronized and globally consistent. Once the transaction is complete, the distributed services transaction manager 101 unlocks the transaction and pushes an appropriate transaction completion notification $311_{TRANSACTION}$ to the endpoint 210.

In some embodiments, the distributed services transaction manager 101 operates in conjunction with or as part of a broader backend SPOC system. For example, the distributed services transaction manager 101 can be instantiated in conjunction with a SPOC cloud based service 109 which provides SPOC intermediary functionality in other contexts as well. For example, a secure email proxy could use the SPOC cloud based service 109 as an intermediary to a push notification service (e.g., APNS, GCM, etc.) to facilitate push email notification to client mobile devices running a secure email app. In other embodiments, the distributed services transaction manager 101 is instantiated as a dedicated SPOC service 109 for facilitating transactions across multiple distributed services 109

As the different services 109 utilized in multi-service transactions are geo-located in different datacenters and many provide full high availability, individual services 109 can complete their transaction operations before the transaction as a whole is complete. Without the distributed services transaction manager 101, notifications from individual services 109 could be provided to the endpoint 210 before the transaction is a whole is complete and the services 109 are consistent at a backend level, which would potentially cause timing and synchronization errors on the endpoint 210. The use of the distributed services transaction manager 101 described herein prevents these problems.

As illustrated in FIG. 3, a receiving module 303 of the distributed services transaction manager 101 receives a request 305 to initiate a transaction utilizing multiple separate distributed cloud based services 109, from an endpoint computer 210. In response to receiving the request 305, an identifier generating module 307 of the distributed services transaction manager 101 generates a transaction identifier 301 for the initiated transaction utilizing the multiple separate distributed cloud based services 109. The transaction identifier 301 is in the form of a single, unique identifier of the specific transaction that can be used to reference and identify the transaction by the distributed services transaction manager 101, each service 109 involved in the transaction and the initiating endpoint 210. The specific format of the transaction identifier 301 is a variable design parameter. In one embodiment, the transaction identifier 301 indicates the specific number of separate distributed cloud based services 109 that are to be utilized by the transaction. In other words, where a specific transaction involves three separate services (e.g., authentication, payment and fulfillment), the corresponding transaction identifier 301 would include an indication that three services 109 are expected to be executed during the course of the transaction.

A transmitting module 309 of the distributed services transaction manager 101 transmits the generated transaction identifier 301 to the endpoint 210, thereby indicating to the endpoint 210 to call each one of the separate distributed cloud based services 109 for the transaction, with the transaction identifier 301. In other words, the receipt of the transaction identifier 301 from the distributed services transaction manager 101 directs the endpoint 210 to include the transaction identifier 301 in its calls to the various services 109 for the transaction. The specific implementation details to use for including the transaction identifier 301 in a service call can vary between embodiments. For example, in one embodiment an additional header is added to requests made in Hypertext Transfer Protocol (HTTP) for the inclusion of the transaction identifier 301. In other embodiments utilizing other (e.g., custom) protocols, a field or the like is added or otherwise defined for the transaction identifier 301. Regardless of the specific format, the unique transaction identifier 301 is provided to each separate service 109 that is utilized within the transaction.

Once each service 109 has completed its operation, it generates a service completion notification $311_{SERVICE}$ containing the transaction identifier 301. As the different ones of the separate distributed cloud based services 109 complete their operations, the receiving module 303 of the distributed services transaction manager 101 receives separate service completion notifications $311_{SERVICE}$ with the generated transaction identifier 301 from the various services 109. The specific format of the service completion notifications $311_{SERVICE}$ can vary between embodiments. For example, a service completion notification $311_{SERVICE}$ can be in the form of an HTTP or Message Bus based event that is passed to the distributed services transaction manager 101. Regardless, as the various services 109 complete, the receiving module 303 can receiving separate service completion notifications $311_{SERVICE}$ with the transaction identifier 301 from the separate distributed cloud based services 109 over a period of time. Only after a separate service completion notification $311_{SERVICE}$ containing the transaction identifier 301 has been received from each one of the separate distributed cloud based services 109, the distributed services transaction manager 101 marks the transaction as complete and the transmitting module 309 transmits a corresponding transaction completion notification $311_{TRANSACTION}$ to the endpoint computer 210 with the transaction identifier 301. The transaction completion notification $311_{TRANSACTION}$ indicates that the transaction is complete across all of the services 109. The specific format used to include the transaction identifier 301 in the transaction completion notification $311_{TRANSACTION}$ can vary between embodiments. For example, this can be accomplished with a header, or via inclusion in the payload body itself. Regardless, the notification informs the endpoint 210 that the transaction has been completed across all services 109, and thus all backend systems are ready for post-transaction calls.

The above-described utilization of the transaction identifier 301 can be thought of as the distributed services transaction manager 101 locking the multi-service transaction upon generation of the transaction identifier 301, and subsequently unlocking the transaction only upon completion of each separate distributed cloud based service 109, as indicated by the receipt of the corresponding service completion notifications $311_{SERVICE}$.

In some embodiments, the distributed services transaction manager 101 can provide additional functionality, such as determining the status of a multi-service transaction that is in progress (e.g., which services 109 have completed and which are still pending). This information can be used in conjunction with setting time limits for specific services 109 and/or the transaction as a whole to complete, prior to either rolling back the state or sending a notification 311 to the endpoint 210 while the transaction is not complete. What specific actions to take in response to various partially complete transaction state scenarios can vary between embodiments.

Figure 4:
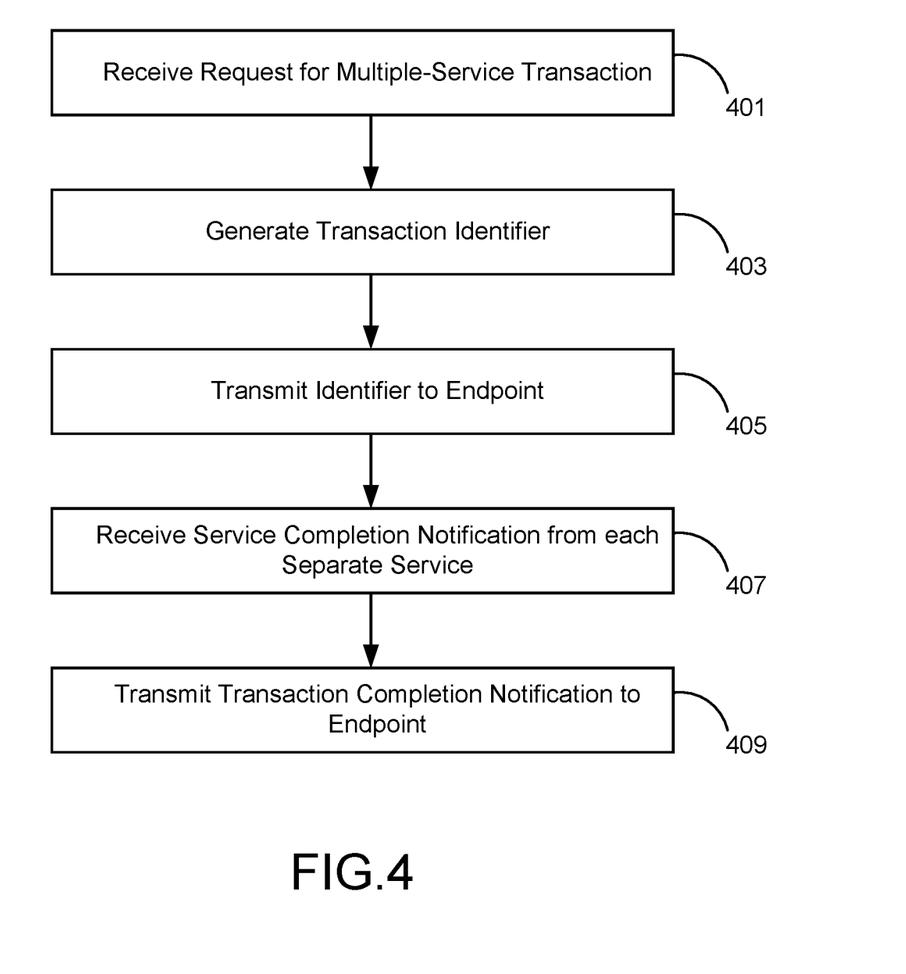
FIG. 4 is a flow chart of the steps an exemplary method of the operation of a distributed web services transactions manager, according to some embodiments.

FIG. 4 illustrates a distributed web services transactions manager 101 executing steps for providing synchronized transactions across multiple, separate distributed cloud based services 109 located on separate datacenters, according to one embodiment. The receiving module 303 receives 401 a request 305 from an endpoint 210 to initiate a transaction utilizing multiple separate distributed cloud based services 109. In response, the identifier generating module 307 generates 403 a transaction identifier 301 for the initiated multiple-service transaction. The transmitting module 309 transmits 405 the generated transaction identifier 301 to the endpoint 210, thereby directing the endpoint 210 to call each one of the separate distributed cloud based services 109, with the generated transaction identifier 301. As the separate services 109 complete their operations, the receiving module 303 receives 407 a separate service completion notification $311_{SERVICE}$ containing the generated transaction identifier 301, from each one of the separate distributed cloud based services 109. Only in response to receiving a separate service completion notification $311_{SERVICE}$ with the generated transaction identifier 301 from each one of the separate distributed cloud based services 109, the transmitting module 309 transmits 409 a transaction completion notification $311_{TRANSACTION}$ containing the generated transaction identifier 301 to the endpoint 210.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for providing synchronized transactions across multiple, separate distributed cloud based services located on separate datacenters, the method comprising the steps of:
   generating, by a single point of contact server computer, a transaction identifier for a transaction utilizing multiple separate distributed cloud based services located on separate datacenters;
   transmitting, by the single point of contact server computer to an endpoint computer, the generated transaction identifier for the transaction utilizing the multiple separate distributed cloud based services;
   wherein receipt of the generated transaction identifier for the transaction from the single point of contact server computer directs the endpoint computer to call each one of the separate distributed cloud based services, with the generated transaction identifier for the transaction;
   receiving, from each one of the separate distributed cloud based services, by the single point of contact server computer, a separate service completion notification with the generated transaction identifier, each separate service completion notification indicating that a corresponding separate service has completed; and
   transmitting a transaction completion notification with the generated transaction identifier, by the single point of contact server computer to the endpoint computer, the transaction completion notification indicating that the transaction utilizing the multiple separate distributed cloud based services is complete, only in response to receiving a separate service completion notification with the generated transaction identifier from each one of the separate distributed cloud based services.

2. The method of claim 1 wherein generating, by a single point of contact server computer, a transaction identifier for a transaction utilizing multiple separate distributed cloud based services located on separate datacenters further comprises:
   generating, by the single point of contact server computer, a transaction identifier for a transaction utilizing a specific plural number of separate distributed cloud based services located on separate datacenters, the generated transaction identifier indicating the specific plural number of separate distributed cloud based services utilized by the transaction.

3. The method of claim 1 wherein generating, by a single point of contact server computer, a transaction identifier for a transaction utilizing multiple separate distributed cloud based services located on separate datacenters further comprises:
   receiving, by the single point of contact server computer from the endpoint computer, a request to initiate the transaction utilizing multiple separate distributed cloud based services; and
   in response to receiving the request, generating, by the single point of contact server computer, the transaction identifier for the transaction utilizing multiple separate distributed cloud based services.

4. The method of claim 1 wherein receiving, from each one of the separate distributed cloud based services, by the single point of contact server computer, a separate service completion notification with the generated transaction identifier, each separate service completion notification indicating that a corresponding separate service has completed further comprises:
   receiving, by the single point of contact server computer, separate events with the generated transaction identifier from the separate distributed cloud based services, each received event signaling completion of a corresponding service.

5. The method of claim 1 wherein transmitting a transaction completion notification with the generated transaction identifier, by the single point of contact server computer to the endpoint computer, the transaction completion notification indicating that the transaction utilizing the multiple separate distributed cloud based services is complete, only in response to receiving a separate service completion notification with the generated transaction identifier from each one of the separate distributed cloud based services further comprises:
receiving separate service completion notifications with the generated transaction identifier from the separate distributed cloud based services over a period of time; and
transmitting the transaction completion notification to the endpoint computer with the generated transaction identifier indicating that the transaction utilizing the multiple separate distributed cloud based services is complete, only after a separate service completion notification with the generated transaction identifier has been received from each one of the separate distributed cloud based services.

6. The method of claim 1 further comprising:
locking, by the single point of contact server computer, the transaction utilizing multiple separate distributed cloud based services upon generation of the transaction identifier; and
unlocking, by the single point of contact server computer, the transaction utilizing multiple separate distributed cloud based services upon completion of each separate distributed cloud based service utilized by the transaction.

7. The method of claim 1 wherein the endpoint computer further comprises:
a client computer that initiates the transaction utilizing multiple separate distributed cloud based services.

8. The method of claim 1 wherein the endpoint computer further comprises:
a computer associated with provision of a service that in turn initiates the transaction utilizing multiple separate distributed cloud based services.

9. The method of claim 1 further comprises:
determining a status of the transaction utilizing multiple separate distributed cloud based services, prior to completion of each separate distributed cloud based service utilized by the transaction.

10. At least one non-transitory computer readable medium for providing synchronized transactions across multiple, separate distributed cloud based services located on separate datacenters, the at least one non-transitory computer readable medium storing computer executable instructions that, when loaded into computer memory and executed by at least one processor of at least one computing device, cause the at least one computing device to perform the following steps:
generating, by a single point of contact server computer, a transaction identifier for a transaction utilizing multiple separate distributed cloud based services located on separate datacenters;
transmitting, by the single point of contact server computer to an endpoint computer, the generated transaction identifier for the transaction utilizing the multiple separate distributed cloud based services;
wherein receipt of the generated transaction identifier for the transaction from the single point of contact server computer directs the endpoint computer to call each one of the separate distributed cloud based services, with the generated transaction identifier for the transaction;
receiving, from each one of the separate distributed cloud based services, by the single point of contact server computer, a separate service completion notification with the generated transaction identifier, each separate service completion notification indicating that a corresponding separate service has completed; and
transmitting a transaction completion notification with the generated transaction identifier, by the single point of contact server computer to the endpoint computer, the transaction completion notification indicating that the transaction utilizing the multiple separate distributed cloud based services is complete, only in response to receiving a separate service completion notification with the generated transaction identifier from each one of the separate distributed cloud based services.

11. The at least one non-transitory computer readable medium of claim 10 wherein generating, by a single point of contact server computer, a transaction identifier for a transaction utilizing multiple separate distributed cloud based services located on separate datacenters further comprises:
generating, by the single point of contact server computer, a transaction identifier for a transaction utilizing a specific plural number of separate distributed cloud based services located on separate datacenters, the generated transaction identifier indicating the specific plural number of separate distributed cloud based services utilized by the transaction.

12. The at least one non-transitory computer readable medium of claim 10 wherein generating, by a single point of contact server computer, a transaction identifier for a transaction utilizing multiple separate distributed cloud based services located on separate datacenters further comprises:
receiving, by the single point of contact server computer from the endpoint computer, a request to initiate the transaction utilizing multiple separate distributed cloud based services; and
in response to receiving the request, generating, by the single point of contact server computer, the transaction identifier for the transaction utilizing multiple separate distributed cloud based services.

13. The at least one non-transitory computer readable medium of claim 10 wherein receiving, from each one of the separate distributed cloud based services, by the single point of contact server computer, a separate service completion notification with the generated transaction identifier, each separate service completion notification indicating that a corresponding separate service has completed further comprises:
receiving, by the single point of contact server computer, separate events with the generated transaction identifier from the separate distributed cloud based services, each received event signaling completion of a corresponding service.

14. The at least one non-transitory computer readable medium of claim 10 wherein transmitting a transaction completion notification with the generated transaction identifier, by the single point of contact server computer to the endpoint computer, the transaction completion notification indicating that the transaction utilizing the multiple separate distributed cloud based services is complete, only in response to receiving a separate service completion notification with the generated transaction identifier from each one of the separate distributed cloud based services further comprises:
receiving separate service completion notifications with the generated transaction identifier from the separate distributed cloud based services over a period of time; and
transmitting the transaction completion notification to the endpoint computer with the generated transaction identifier indicating that the transaction utilizing the multiple separate distributed cloud based services is complete, only after a separate service completion notification with the generated transaction identifier has been received from each one of the separate distributed cloud based services.

15. The at least one non-transitory computer readable medium of claim 10 further comprising:
   locking, by the single point of contact server computer, the transaction utilizing multiple separate distributed cloud based services upon generation of the transaction identifier; and
   unlocking, by the single point of contact server computer, the transaction utilizing multiple separate distributed cloud based services upon completion of each separate distributed cloud based service utilized by the transaction.

16. The at least one non-transitory computer readable medium of claim 10 wherein the endpoint computer further comprises:
   a client computer that initiates the transaction utilizing multiple separate distributed cloud based services.

17. The at least one non-transitory computer readable medium of claim 10 wherein the endpoint computer further comprises:
   a computer associated with provision of a service that in turn initiates the transaction utilizing multiple separate distributed cloud based services.

18. The at least one non-transitory computer readable medium of claim 10 further comprises:
   determining a status of the transaction utilizing multiple separate distributed cloud based services, prior to completion of each separate distributed cloud based service utilized by the transaction.

19. A computer system for providing synchronized transactions across multiple, separate distributed cloud based services located on separate datacenters, the computer system comprising:
   a processor;
   system memory;
   an identifier generating module residing in the system memory, the identifier generating module being programmed to generate a transaction identifier for a transaction utilizing multiple separate distributed cloud based services located on separate datacenters;
   a transmitting module residing in the system memory, the transmitting module being programmed to transmit, by a single point of contact server computer to an endpoint computer, the generated transaction identifier for the transaction utilizing the multiple separate distributed cloud based services;
   wherein receipt of the generated transaction identifier for the transaction from the single point of contact server computer directs the endpoint computer to call each one of the separate distributed cloud based services, with the generated transaction identifier for the transaction;
   a receiving module residing in the system memory, the receiving module being programmed to receive, from each one of the separate distributed cloud based services, by the single point of contact server computer, a separate service completion notification with the generated transaction identifier, each separate service completion notification indicating that a corresponding separate service has completed; and
   wherein the transmitting module is further programmed to transmit a transaction completion notification with the generated transaction identifier, by the single point of contact server computer to the endpoint computer, the transaction completion notification indicating that the transaction utilizing the multiple separate distributed cloud based services is complete, only in response to receiving a separate service completion notification with the generated transaction identifier from each one of the separate distributed cloud based services.

20. The computer system, of claim 19 wherein generating, by a single point of contact server computer, a transaction identifier for a transaction utilizing multiple separate distributed cloud based services located on separate datacenters further comprises:
   receiving, by the single point of contact server computer from the endpoint computer, a request to initiate the transaction utilizing multiple separate distributed cloud based services; and
   in response to receiving the request, generating, by the single point of contact server computer, the transaction identifier for the transaction utilizing multiple separate distributed cloud based services.

* * * * *